May 9, 1939.  H. FISCHER  2,157,659

INJECTION ENGINE

Filed Oct. 23, 1937  2 Sheets-Sheet 1

Inventor:
Hans Fischer
By Brown, Jackson, Boettcher & Dienner
Attys.

May 9, 1939.  H. FISCHER  2,157,659
INJECTION ENGINE
Filed Oct. 23, 1937  2 Sheets-Sheet 2

Inventor:
Hans Fischer
By Brown, Jackson, Boettcher & Dienner
Attys.

UNITED STATES PATENT OFFICE 2,157,659

INJECTION ENGINE

Hans Fischer, Yonkers, N. Y., assignor to Lanova Corporation, Long Island City, N. Y., a corporation of Delaware Application October 23, 1937, Serial No. 170,570

3 Claims. (Cl. 123—32)

This invention relates to injection engines, in which the fuel mixture is ignited by the heat of compression, and has to do with engines of the supplementary chamber type.

It is known to provide engines of the character referred to, in which a so-called air storage chamber, or supplementary chamber, opens into the combustion chamber through a restricted orifice and a funnel-like passage leading therefrom and flaring inward of the combustion chamber. In the engines referred to, a portion of the injected fuel enters the supplementary chamber forming therein, with air stored in such supplementary chamber, a rapidly burning fuel mixture. This mixture is ignited incident to ignition of the fuel mixture in the combustion chamber, resulting in relatively high pressure within the supplementary chamber and the ejection therefrom, into the combustion chamber, of a high pressure high velocity fluid stream or blast of incandescent gases, which blast is utilized to impart controlled turbulence to the contents of the combustion chamber for mixing the fuel and air therein. While such engines have proved to be highly efficient in many respects, I find that the feature of utilizing the blast from the supplementary chamber for moving the contents of the combustion chamber through definite paths, for obtaining controlled turbulence, causes a certain lag in the rate of combustion, particularly in the early part of the working stroke of the piston.

It is important, in injection engines, to effect the completion of combustion as rapidly as possible after the piston has passed its inner dead center position, which is its position of maximum compression, consistent with the avoidance of objectionably high peak pressures, since that contributes materially to the efficiency of the engine. The instant invention is directed primarily to the attainment of that result.

In engines of the character referred to the velocity of the blast ejected from the supplementary chamber, and therefore the energy derived from the supplementary chamber for effecting mixing of fuel and air in the combustion chamber, is dependent upon the rapidity of combustion within the supplementary chamber. It is of utmost importance that the blast be ejected from the supplementary chamber as rapidly as possible, in order to assure completion of combustion within the combustion chamber in the early part of the combustion or working stroke of the piston. This means that the fuel air mixture within the supplementary chamber must be such as to burn with the maximum possible rapidity consistent with the creation of relatively high pressure within this supplementary chamber. Accordingly, the distance between the tip of the fuel injection nozzle and the orifice of the supplementary chamber is of paramount importance. If that distance is too great, the fuel air mixture within the supplementary chamber will be too lean and adequately high pressure will not be created therein. If the distance is too short, the fuel air mixture within the supplementary chamber will be too rich, the rate of combustion therein will be low, and adequately high pressure will not be created. It will be apparent that for a given engine there is a critical distance between the orifice of the supplementary chamber and the tip of the injection nozzle, which determines the efficiency of that engine. This critical distance depends upon the injection pressure and related factors and may be determined by experimentation. An important object of my invention is to provide an engine in which the combustion chamber and appurtenant parts are so constructed and related that the distance between the supplementary chamber orifice and the injection nozzle tip may be such as to assure maximum efficiency, whether the engine be of small or large cylinder bore.

A further object is to provide an engine in which the combustion chamber is of simple form and may be readily machined, with a view to low cost of production.

Further objects and advantages will appear from the detail description.

Figure 1:
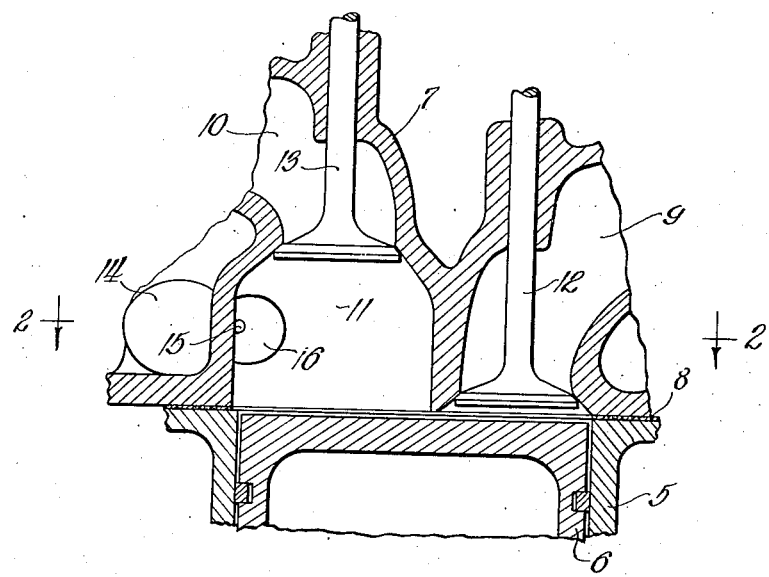
Figure 1 is an axial sectional view through the cylinder head and the upper portion of the cylinder of an engine embodying my invention, showing those parts with which my invention is concerned, taken substantially on line 1—1 of Figure 2, certain parts being shown in elevation and parts being broken away.
Figure 2:
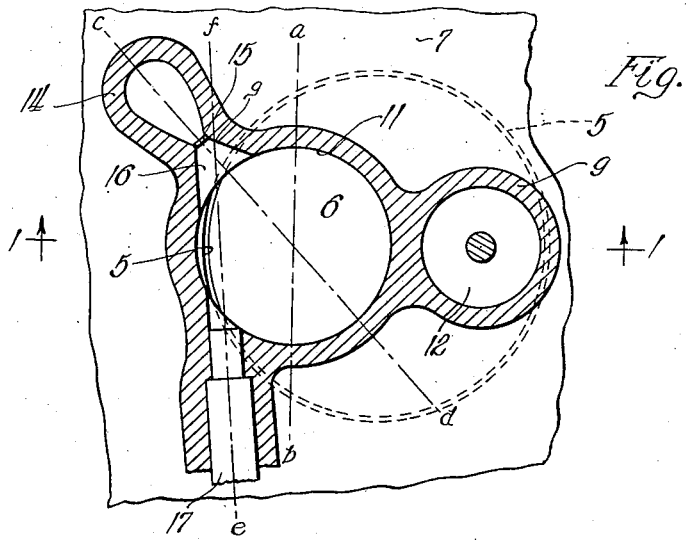
Figure 2 is a sectional view taken substantially on line 2—2 of Figure 1, the fuel injection nozzle being shown fragmentarily and in plan.

Referring to Figures 1 and 2, the engine comprises a cylinder 5, a piston 6 operating in the cylinder, and a cylinder head 7 removably mounted on the upper end of the cylinder, in a known manner, with an intervening gasket 8. Head 7 is provided with two passages 9 and 10, the latter opening into combustion chamber 11 of circular shape in plan, through the roof thereof, formed in the head and overlying and opening downward into the cylinder area. The passages 9 and 10 are controlled by overhead valves 12 and 13, respectively, operated in a manner well known in the art, and either of these passages may be the inlet passage, the other being the exhaust passage.

Head 7 is further provided with a supplementary chamber 14, which opens into combustion chamber 11 through a restricted orifice 15 and a funnel-like passage 16 leading from the orifice and flaring inward of the combustion chamber. Orifice 15 is directed toward the center of combustion chamber 11, the axis c—d of this orifice passing through the center of the combustion chamber, as shown in Figure 2, and orifice 15 and passage 16 being disposed to one side of and spaced from transverse axis a—b of the combustion chamber. A fuel injection nozzle 17, of known type, opens into the combustion chamber 11, this nozzle being provided with a coaxial injection port, the axis of which and of the nozzle is indicated by the line e—f. The port of nozzle 17 is thus disposed to inject a stream of fuel into the combustion chamber along the line e—f, intersecting the axis c—d of orifice 15 within passage 16 and in advance of the orifice. It will be noted that the line e—f approaches parallelism with axis a—b of combustion chamber 11, but diverges slightly therefrom towards orifice 15 of the supplementary chamber. It will further be noted that the port of the injection nozzle is disposed at the same side of axis a—b of the combustion chamber as the orifice 15 of the energy cell, and that the fuel stream is injected chordally of the combustion chamber adjacent one side thereof so as to impinge upon the wall of passage 16, at the side of the latter more remote from the inner face or tip of the injection nozzle at point g, a short distance in advance of orifice 15.

In the operation of the engine, as the piston 6 moves upward or inward during its compression stroke, the displaced air is compressed within the combustion chamber 11, and a certain amount of the air charge is stored within the supplementary chamber 14 under compression, the pressure of the air within the supplementary chamber being less than the pressure of the air within the combustion chamber, due to the restricted orifice 15. Accordingly, during the continued inward travel of piston 6 air will continue to flow from combustion chamber 11 into the supplementary chamber, through orifice 15.

As the piston approaches its inner dead center position, which is its position of maximum compression, fuel is injected into the combustion chamber, the tip of the injected fuel stream entering passage 16, the inner face of the injection nozzle being appropriately spaced from orifice 15 to that end. The injection of fuel continues until the piston has traveled a predetermined distance outward on its working or combustion stroke, as is usual and well known in the art. An appreciable amount of the injected fuel is deflected from the wall of passage 16 through orifice 15 into supplementary chamber 14, this action being supplemented by air flowing through orifice 15 into the supplementary chamber and carrying thereinto a further amount of fuel. The fuel and air are thoroughly mixed within the supplementary chamber and form therein a rapidly burning fuel mixture, the injection port of nozzle 17 being so spaced from orifice 15 of the supplementary chamber as to assure that the proper amount of fuel will enter the latter to produce therein a fuel air mixture of such proportions as to assure maximum efficiency, in the manner previously described. In the continued inward travel of piston 6, the fuel within the combustion chamber is ignited by the heat of compression. Since the fuel is injected chordally of chamber 11, at one side thereof, the injected fuel mixes with the air at that side of the chamber, there producing an excessively rich fuel air mixture, which burns sluggishly, leaving the major portion of the air charge within the combustion chamber substantially uncontaminated by fuel. The sluggish burning of the fuel mixture at the side of the combustion chamber is of advantage as avoiding objectionably high peak pressures when the piston 6 is on the dwell of its inward or compression stroke. The fuel mixture within the supplementary chamber 14 is then ignited, by flame propagation from the combustion chamber 11. The mixture within the supplementary chamber burns with extreme rapidity, relative to the rich mixture within combustion chamber 11 at the side thereof, with the result that the pressure within the energy cell is abruptly raised to a high value relative to that within the combustion chamber. Due to the relatively high pressure existing within the supplementary chamber, a fluid stream or blast of incandescent gases is ejected through orifice 15 into combustion chamber 11 radially thereof, along the line c—d. This blast intersects the injected fuel stream laterally thereof and diverts the fuel of this stream, as well as the rich fuel air mixture adjacent passage 16, laterally of the line e—f into the central portion of combustion chamber 11, which is the portion of maximum volume of the combustion chamber. This creates a general turbulence within the combustion chamber effective for causing thorough and extremely rapid intermixing of the fuel and the air, thus producing within the combustion chamber a fuel air mixture so proportioned that exceptionally rapid combustion thereof occurs. Such of the fuel and air within the combustion chamber as is not directly contacted and mixed by the blast from the supplementary chamber is displaced by such blast and caused to impact the wall of the combustion chamber opposite the orifice 15 and passage 16, from which wall the fuel and air are reflected back toward passage 16 and orifice 15, the reflected waves of fuel and air resulting in further intermixing thereof. This action is permitted, and the kinetic energy of the blast from the supplementary chamber is utilized to maximum advantage, by injecting the fuel in the manner above stated, so that the injected stream of fuel offers no objectionable opposition to the blast ejected from the supplementary chamber. In this manner, I assure extremely rapid and thorough intermixing of the fuel and the air within the combustion chamber and thereby produce a substantially homogeneous mixture of fuel and air such that the resulting mixture burns with extreme rapidity. As a result, combustion of the fuel mixture charge is completed during the first part of the combustion or working stroke of the piston 6, before the latter has moved an appreciable distance away from its inner dead center position, which results in materially increased efficiency in operation of the engine.

Figure 3:
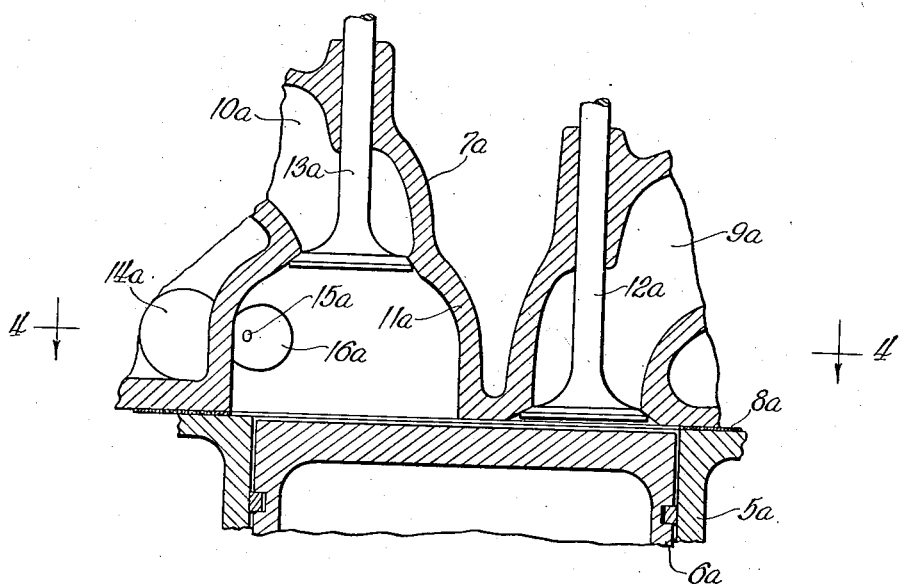
Figure 3 is a view similar to Figure 1, illustrating a modification, taken substantially on line 3—3 of Figure 4.
Figure 4:
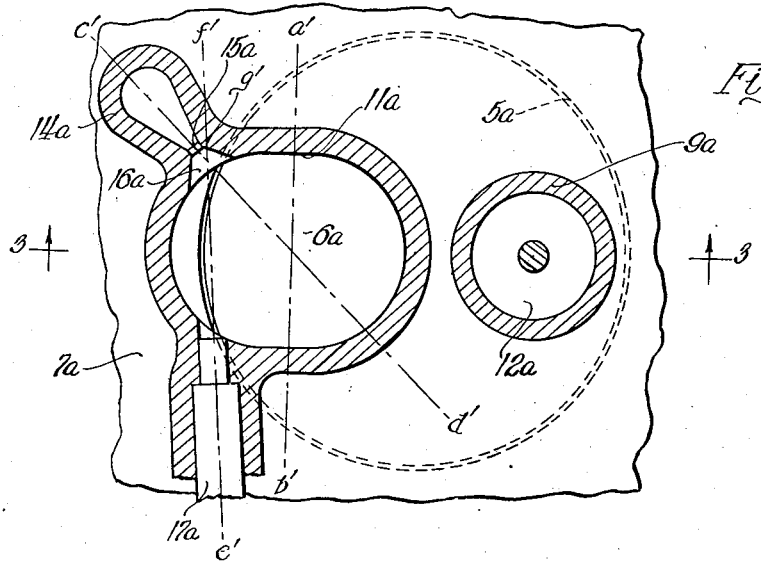
Figure 4 is a sectional view taken substantially on line 4—4 of Figure 3, the fuel injection nozzle being shown fragmentarily and in plan.

The arrangement shown in Figures 1 and 2 is particularly suitable for engines of medium or small cylinder bore. For engines of larger cylinder bore, the arrangement shown in Figures 3 and 4 is preferable. Referring to the two latter figures, the engine comprises a cylinder 5a, a piston 6a operating therein, a cylinder head 7a mounted on the upper end of the cylinder with an intervening gasket $8a$, the cylinder head being provided with passages $9a$ and $10a$, controlled by overhead valves $12a$ and $13a$, respectively, passage $10a$ opening through the roof of a combustion chamber $11a$ of substantially elliptical shape in plan. A supplementary chamber $14a$ opens into combustion chamber $11a$ through a restricted orifice $15a$ and a funnel-like passage $16a$ leading from the orifice and flaring inward of the combustion chamber, the orifice and the passage being disposed to one side of and spaced from axis $a^1$—$b^1$ of the combustion chamber. Orifice $15a$ is directed toward the center of the combustion chamber, the axis of such orifice being indicated by the line $c^1$—$d^1$. Injection nozzle $17a$ injects a stream of fuel into the combustion chamber transversely and adjacent one side thereof, along the line $e^1$—$f^1$, intersecting line $c^1$—$d^1$ and forming an acute angle therewith, the line of injection of fuel approximating parallelism with axis $a^1$—$b^1$ and diverging but slightly therefrom toward the orifice $15a$ of the energy cell. The line of injection of fuel $e^1$—$f^1$ intersects line $c^1$—$d^1$ within passage $16a$, in advance of orifice $15a$, and the stream of injected fuel impinges upon the wall of passage $16a$ more remote from the inner face of nozzle $17a$ at point $g^1$. The combustion chamber $11a$ is of maximum volume at its central portion, as in the engine of Figures 1 and 2. In the engine of Figures 3 and 4, the inner face or tip of the injection nozzle is spaced such a distance from the orifice of the supplementary chamber as to assure that the proper amount of fuel will enter the latter to assure the creation of maximum pressure therein, as in Figures 1 and 2, this correct spacing of the orifice of the supplementary chamber and the tip of the injection nozzle being rendered possible by disposing the supplementary chamber and the injection nozzle in the manner illustrated and described. The operation of the engine shown in Figures 3 and 4 is similar to that of the engine of Figures 1 and 2 and need not be described here in detail.

As above indicated, and as will be understood by those skilled in the art, changes in construction and arrangement of parts of my invention may be resorted to without departing from the field and scope of the same, and I intend to include all such variations, as fall within the scope of the appended claims, in this application in which the preferred forms only of my invention have been disclosed.

I claim:

1. In an injection engine comprising a cylinder and a piston operating therein, a combustion chamber substantially circular in plan opening into said cylinder, a supplementary chamber opening into said combustion chamber at one side thereof through a restricted orifice and a funnel-like passage leading from said orifice flaring inward of said combustion chamber, said orifice and passage being disposed to direct a high pressure high velocity fluid stream ejected from said supplementary chamber across said combustion chamber along a horizontal line corresponding to a diameter thereof, and a fuel injection nozzle having a port disposed to inject a stream of fuel into said combustion chamber and into said passage along a second horizontal line corresponding to a chord of said combustion chamber and in the same horizontal plane as said first horizontal line, said lines intersecting within said flaring passage at an acute angle, said first and said second horizontal lines being in different vertical planes, the distance between the port of said nozzle and said orifice and passage being such as to assure entry of injected fuel into said supplementary chamber in proper amount to form with the air therein a fuel air mixture so proportioned as to give the maximum rate of and complete combustion effective for ejecting a high pressure high velocity fluid stream from said supplementary chamber through said orifice and passage.

2. In an injection engine comprising a cylinder and a piston operating therein, a combustion chamber substantially circular in plan of materially less diameter than and overlying an opening into said cylinder, a supplementary chamber opening into said combustion chamber at one side thereof through a restricted orifice and a funnel-like passage leading from said orifice flaring inward of said combustion chamber, said orifice and passage being disposed to direct a high pressure high velocity fluid stream ejected from said supplementary chamber across said combustion chamber along a horizontal line corresponding to a diameter thereof, and a fuel injection nozzle having a port disposed to inject a stream of fuel into said combustion chamber and into said passage along a second horizontal line corresponding to a chord of said combustion chamber and in the same horizontal plane as said first horizontal line, said first and said second horizontal lines being in different vertical planes, the distance between the port of said nozzle and said orifice and passage being such as to assure entry of injected fuel into said supplementary chamber in proper amount to form with the air therein a fuel air mixture so proportioned as to give the maximum rate of and complete combustion effective for ejecting a high pressure high velocity fluid stream from said supplementary chamber through said orifice and passage.

3. In an injection engine comprising a cylinder and a piston operating therein, a combustion chamber substantially elliptical in plan opening into said cylinder, a supplementary chamber opening into said combustion chamber through a restricted orifice and a funnel-like passage leading from said orifice flaring inward of said combustion chamber, said orifice and passage being disposed to direct a high pressure high velocity fluid stream ejected from said supplementary chamber across said combustion chamber along a horizontal line, and a fuel injection nozzle having a port disposed to inject a stream of fuel into said combustion chamber and into said passage along a second horizontal line in the same horizontal plane as said first horizontal line, said lines intersecting within said flaring passage at an acute angle, said first and said second horizontal lines being in different vertical planes, the distance between the port of said nozzle and said orifice and passage being such as to assure entry of injected fuel into said supplementary chamber in proper amount to form with the air therein a fuel air mixture so proportioned as to give the maximum rate of and complete combustion effective for ejecting a high pressure high velocity fluid stream from said supplementary chamber through said orifice and passage.

HANS FISCHER.